(12) United States Patent
Koschan et al.

(10) Patent No.: US 9,335,426 B2
(45) Date of Patent: May 10, 2016

(54) INTRINSIC REFLECTORS OF SCINTILLATION DETECTOR ELEMENTS AND FORMATION PROCESS OF INTRINSIC REFLECTORS

(71) Applicant: University of Tennessee Research Foundation, Knoxville, TN (US)

(72) Inventors: Merry Koschan, Knoxville, TN (US); Mohit Tyagi, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 14/340,182

(22) Filed: Jul. 24, 2014

(65) Prior Publication Data
US 2015/0034829 A1    Feb. 5, 2015

Related U.S. Application Data

(60) Provisional application No. 61/860,449, filed on Jul. 31, 2013.

(51) Int. Cl.
*G01T 1/20* (2006.01)
*F27D 7/06* (2006.01)

(52) U.S. Cl.
CPC .................................. *G01T 1/2002* (2013.01)

(58) Field of Classification Search
CPC ............ G01T 1/20; G01T 1/2002; F27D 7/06
See application file for complete search history.

(56) References Cited

U.S. PATENT DOCUMENTS

| | | | |
|---|---|---|---|
| 7,591,894 B2* | 9/2009 | Becker | G01T 1/202 117/3 |
| 9,057,790 B2* | 6/2015 | Perna | G01T 1/2006 |
| 2005/0104000 A1* | 5/2005 | Kindem | G01T 1/1644 250/361 R |
| 2010/0090111 A1* | 4/2010 | Stoller | G01T 1/20 250/337 |
| 2014/0064446 A1* | 3/2014 | Wear | G01N 23/04 378/62 |

\* cited by examiner

*Primary Examiner* — David Porta
*Assistant Examiner* — Faye Boosalis
(74) *Attorney, Agent, or Firm* — Kenyon & Kenyon LLP

(57) ABSTRACT

A radiation sensor may include a scintillator, a reflector, and a sensor. The scintillator may be capable of converting non-visible radiation into scintillation light. The reflector may be formed from material of outside surfaces of the scintillator, to reflect the scintillation light. The sensor may be positioned in proximity to the scintillator, to detect the scintillation light from the scintillator. A method of manufacturing a scintillator with an intrinsic reflector may include heating the scintillator in an oxygen-deficient environment at a first temperature for a first predetermined time period, and optionally annealing the scintillator in an oxygenated environment at a second temperature for a second predetermined time period.

18 Claims, 2 Drawing Sheets

100

200

INTRINSIC REFLECTORS OF SCINTILLATION DETECTOR ELEMENTS AND FORMATION PROCESS OF INTRINSIC REFLECTORS

CROSS REFERENCE TO RELATED APPLICATIONS

The present application claims the benefit of U.S. Provisional application, Ser. No. 61/860,449, filed Jul. 31, 2013, entitled "METHOD FOR PRODUCTION AND USE OF A SELF-REFLECTING SCINTILLATION DETECTOR ELEMENT," the disclosure of which is incorporated herein by reference in its entirety.

TECHNICAL FIELD

The present invention is related to high-energy imaging systems and high-energy photon detectors.

BACKGROUND

Scintillation materials are scientifically and economically significant in conjunction with photodetectors to detect high-energy photons, electrons and other particles in various applications, which includes medical imaging, geological exploration, homeland security, and high-energy physics. In radiation detectors/imaging devices, scintillation material (or scintillators) may include, for example, cerium-doped scintillators. Scintillators used in this way are typically in the form of single crystals or ceramics. A detector assembly may contain an array of many smaller scintillator elements. In order to maximize the scintillation light that reaches the photodetector and to prevent that scintillation light from 'leaking' from each scintillator element to adjacent ones, scintillator elements may be coated with a thin layer of non-transparent material with good optical reflectivity.

The externally coated reflector layer, which may be referred to as an "extrinsic reflector," may not bond very well to the scintillator elements and may be undesirably thick, increasing the overall detector size. Also, the manufacturing process of applying the extrinsic reflector is an extra step and therefore an additional cost in constructing a detector that includes pixelized scintillators.

Thus, there is a continual need for a simpler way to produce a reflector for scintillators.

DETAILED DESCRIPTION

Figure 1:
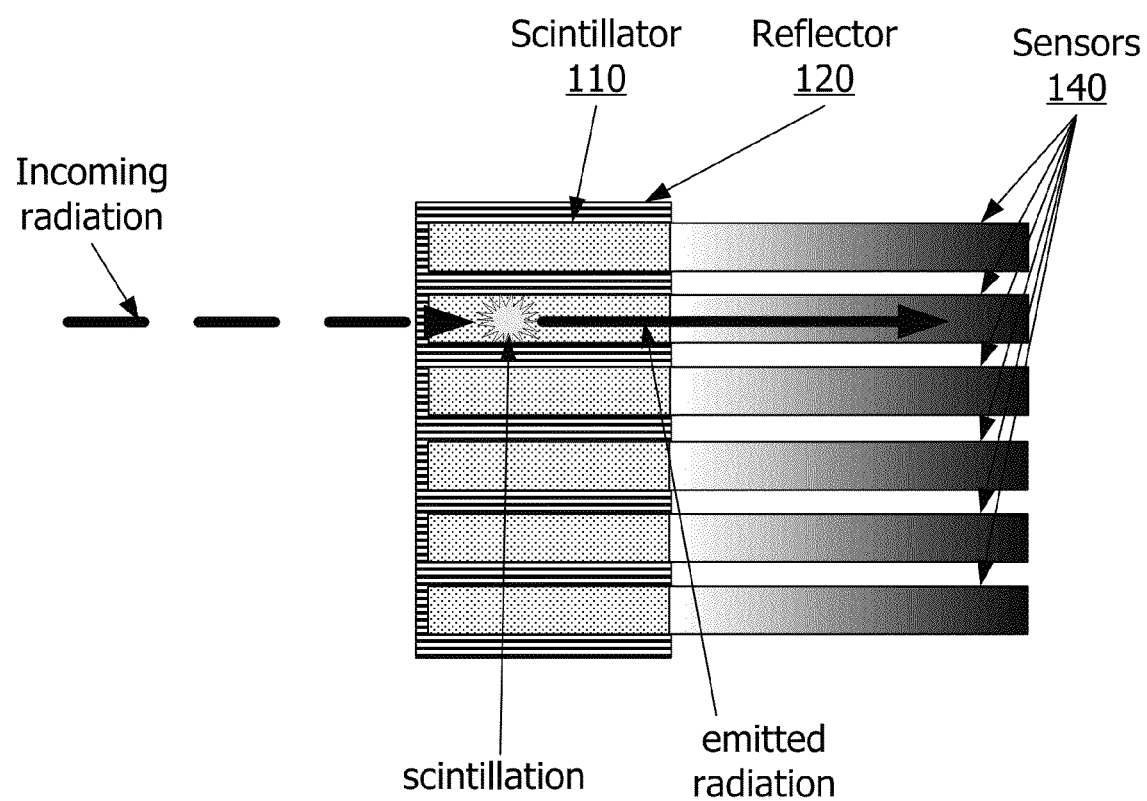
FIG. 1 illustrates a radiation sensor according to an embodiment of the invention.

FIG. 1 illustrates a radiation sensor 100 according to an embodiment of the invention.

According to an embodiment, the radiation sensor 100 may include a scintillator 110, a reflector 120, and a sensor 140.

The scintillator 110 may include various scintillation materials capable of converting non-visible radiation (incoming radiation) into scintillation light (emitted radiation) with a spectrum detectable by the sensor 140. The sensor 140 may be placed in adjacent or in close proximity to the scintillator 110, such that any converted scintillation light may be detected or measured by the sensor 140. The reflector 120 may include a layer of reflective material formed from material of the scintillator 110, to reflect scintillation light and/or guide the scintillation light toward the sensor 140. While the FIG. 1 illustrates one scintillator element (each isolated by the reflector 120 from other scintillator elements) associating with one photodetector element in the sensor 140, other configurations may be possible, such as multiple scintillator elements associated with each photodetector element in the sensor 140.

The scintillator 110 may include a material that, when interacting with ionizing radiation, has a measurable response that may ultimately be used to produce an image or to detect radiation. In some embodiments, the material is a scintillation material that produces photons of light when excited by the incoming radiation. The radiation sensor 100 may include a plurality of scintillator elements each having a scintillator 110. The plurality of scintillator elements may be arranged or positioned in an array or grid pattern, with each scintillator element forming a pixel of the radiation sensor 100. The plurality of scintillator elements may be separated from each other by layers of the reflector 120, to prevent scintillation light from leaking from one scintillator element to the other scintillator elements, and to reflect scintillation light and/or guide the scintillation light toward the sensor 140.

In some embodiments, a radiation sensor 100 may be suitable for use in a variety of radiation detection applications including medical imaging applications such as positron emission tomography (PET), time-of-flight positron emission tomography (TOF-PET), X-ray computed tomography (X-ray CT) or single-photon emission computed tomography (SPECT), and any other multimodality systems (PET-CT, PET-MRI, PETSPECT).

In an embodiment, the scintillator 110 may be garnet-type scintillators, such as Gadolinium Gallium garnet crystals, for example doped with Cerium (Ce) (generally referred to as GGAG:Ce or GAGG:Ce scintillators). In some embodiments, the presently disclosed subject matter incorporates gadolinium gallium garnet crystals or ceramics into the radiation sensor 100 as the scintillation material. However, other material may also be used. Scintillating material compositions may include, but are not limited to, $Gd_3Ga_3Al_2O_{12}$, $Gd_3Ga_2Al_3O_{12}$, $Gd_3Ga_1Al_4O_{12}$, and other variants. These scintillators may be doped with an activator/dopant, such as cerium or praseodymium, with or without one or more codopants.

The sensor 140 may be a photomultiplier tube (PMT), photo-diode, or photo-transistor, or any other types of optical sensors. The measured quantity of light at the sensor 140 may be referred to as 'light yield' or 'light output', and is usually reported either as relative to a known standard or in absolute numbers as photons per MeV.

The reflector 120 may enclose around the scintillator 110 (or each scintillator element) on all surfaces, except the surface facing the sensor 140. In such a configuration, scintillation light generated in the scintillator 110 may be reflected internally in the scintillator 110 and eventually guided toward the sensor 140. The reflector 120 is configured to be thin enough to not interfere significantly with any incoming high energy radiation (such as X-ray or gamma radiation), but thick enough to reflect scintillation light in a spectrum detectable by the sensor 140.

The reflector 120 may comprise $GdAlO_3$ formed from a GGAG scintillator 110, formed by for example, processing and altering the outer portion of the GGAG scintillator into a layer of $GdAlO_3$. This may be referred to as an "intrinsic reflective layer," because the reflective layer material is not externally applied, but rather formed from the scintillator material itself. Alternatively, the reflector 120 may comprise other material formed from a scintillator 110. It should be further noted that while gallium-containing scintillators may form such an intrinsic reflective coating, other oxides such as $Al_2O_3$ or $SiO_2$ also have this potential and therefore other inorganic oxide scintillators may also form such intrinsic reflective coating.

The reflector 120 may be formed by heating the GGAG scintillator 110 in a reductive (or oxygen-deficient) gas environment for a predetermined amount of time. For example, a cubic GGAG crystal of approximately 10 mm×10 mm×10 mm may be heated at 3.3° C./min to 1300° C. in an atmosphere of $N_2$ with 2% $H_2$ in a tube furnace and held at 1300° C. temperature and atmosphere for 5-10 hours before cooling to room temperature at the same rate. During this high temperature treatment, a stable white reflective layer of mostly $GdAlO_3$ may be formed on the surface of the GGAG crystal.

Because the intrinsic reflective coating of the reflector 120 is formed from the scintillator 110 itself, the reflector 120 is naturally bonded to the scintillator 110. No additional bonding step is required during manufacturing.

Figure 2:
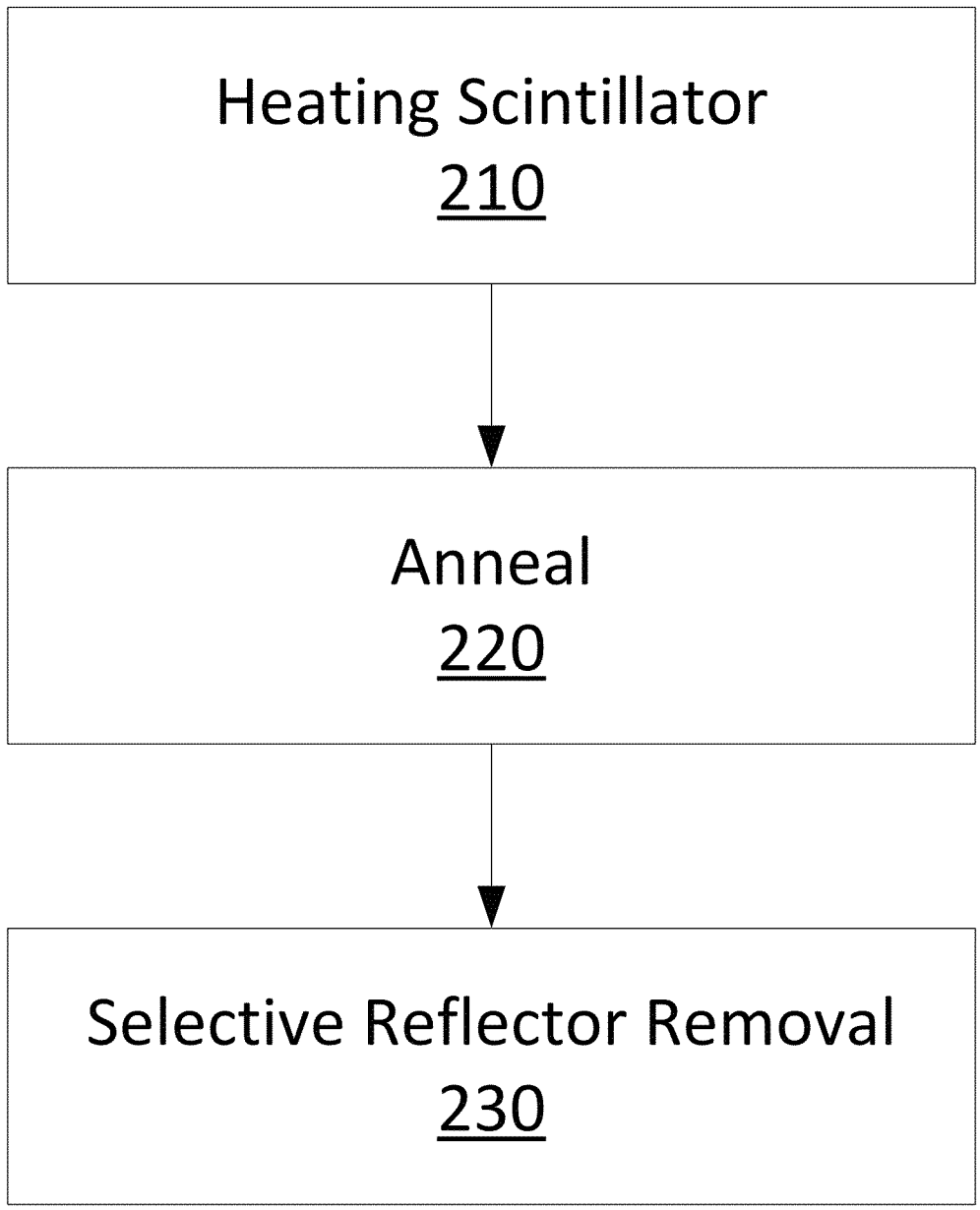
FIG. 2 illustrates an exemplary method of manufacturing according to an embodiment of the invention.

FIG. 2 illustrates an exemplary method 200 of manufacturing according to an embodiment of the invention.

At 210, the scintillator 110 may be heated, for example, in a reductive atmosphere for a predetermined duration to produce an outer layer of intrinsic reflector 120.

At 220, in the event that heating in a reducing atmosphere has a negative impact on the number of photons of light produced by the scintillator when excited by ionizing radiation, it may be desired in an optional step to restore the scintillation performance by heating the scintillator 110 in an atmosphere containing some amount of oxygen. This could be done by either simply changing the reducing atmosphere to an oxidizing one during the same heat cycle, or by reheating the scintillator 110 in the oxidizing atmosphere after completing the reducing heat cycle.

At 230, the intrinsic reflector 120 around the scintillator 110 may be selectively removed to open windows for connecting to the sensor 140.

Many inorganic oxides can decompose or break down when heated in an oxygen-deficient environment. An oxygen deficient environment may include for example, atmospheres with no oxygen, atmospheres containing a reducing gas (such as $H_2$), atmospheres with some but not 'enough' oxygen, as well as vacuum.

For example, when heated in an oxygen deficient atmosphere, lutetium oxyorthosilicate ($Lu_2SiO_5$) may decompose or break down into compounds, such as $SiO_2$ and $Lu_2O_3$. For another example, after heat treating a $Gd_3Ga_3Al_2O_{12}$ (GGAG) crystal in a reducing atmosphere (such as with $H_2$) for several hours (for example, to 1300° C. temperature for 10 hours), a white surface layer may be formed, with good optical reflective properties. The resulting reflective layer is robust and firmly attached to the crystal. X-ray diffraction analysis showed that the white reflective layer is primarily composed of $GdAlO_3$. The reflectivity of this reflective layer can reach 92% and the thickness increases with the cumulative heating time in the reducing atmosphere. This is because during heating in the reductive atmosphere, the scintillator outer layer may decompose and produce gallium sesquioxide ($Ga_2O_3$) and then decompose to the suboxide ($Ga_2O$). The suboxides of gallium may evaporate from the surface of the GGAG crystal and leave a white surface layer of $GdAl_3$ behind. The suboxides of gallium is mostly absent from the white intrinsic reflective layer. Multiple temperature/duration/oxygen-deficient atmosphere type combinations may be possible to perform the heating to decompose the scintillator to form a reflector layer.

While heat treating in a reducing atmosphere may form the intrinsic reflective layer of the reflector 120, it may reduce the scintillation light yield of the scintillator 110. Therefore, a subsequent annealing by heat treatment may be done, for example by heating to 1300° C. temperature for 10 hours in an air atmosphere to restore the light yield. Other temperature and duration combinations may be possible to perform the annealing.

The resulting scintillator 110 may be covered by the reflector 120 on all surfaces. The reflector 120 may be selectively removed to open windows for connecting to the sensor 140. This may be done by various mechanical/chemical polishing techniques, or selectively masking (using for example photoresist masks) before the formation of the intrinsic reflector 120 and later removal of mask layers.

According to various heating time at 1300° C. temperature in an atmosphere of $N_2$ with 2% $H_2$, the average thicknesses of the white intrinsic reflective layer produced are 313±3 μm, 484±5 μm, 724±10 μm, and 1048±38 μm, corresponding respectively to cumulative soaking time of 10 hr, 25 hr, 35 hr, and 50 hr. At 350 μm thickness, reflectivity of the intrinsic reflective layer is measured to be approximately 92% for a visible light at wavelength of 540 nm.

Light yield (LY) measurements were conducted on various scintillator and reflector samples using a Hamamatsu R877 photomultiplier tube (PMT) and a 10 μCi 137 Cs source; no optical couplant was used. LY value is on a scale where a bismuth germanium oxide (BGO) reference crystal is set to 100. Four crystals of approximately the same size were cut from the same boule, and an initial LY measurement was done with a hemispherical reflector to establish that all had equivalent starting LY. One sample was kept in the as-grown state (sample a); three were then subjected to heat treatment in a reducing atmosphere to form the white layer. The white layer was removed with polishing paper from all six sides of one sample (sample b), and from only one side of another sample (sample c). The sample d also had the white layer removed from all 6 sides; it was then wrapped with at least 5 layers of Teflon tape.

In these measurements below in Table 1, with the reflective dome, the measured LY indicates the total quantity of photons emitted from the sample. The performance of the intrinsic reflective layer relative to externally applied Teflon tape was evaluated by measuring the LY of the crystals without the reflective dome. In this case, the relative LY is an indicator of the relative ability of the intrinsic reflector and the Teflon tape to redirect photons into the PMT. The LY of the four crystals measured with the dome is very similar for all samples as shown in Table 1. Therefore, the LY measured without the dome can be used to indicate directly the performance of the reflective layer. As shown, the LY without the dome is very similar for samples a and b (both of which are bare GGAG crystals). This is expected since neither sample had a reflector coating to direct the photons. The LY for both samples c and d (both covered with a reflector) without the dome is greater than for samples a and b.

TABLE 1

The LY measurements of GGAG crystals under different conditions.
(The value is on a scale where the light yield of a BGO reference
crystal is set to 100)

| Relative LY | Sample a | Sample b | Sample c | Sample d |
|---|---|---|---|---|
| With dome | 275 | 273 | 274 | 275 |
| Without dome | 109 | 107 | 182-221 | 218 |

Samples:
a) As-grown GGAG
b) GGAG with intrinsic reflective layer removed
c) GGAG with reflective layer on five surfaces (values include multiple measurements with increasing cumulative soak times, see FIG. 8)
d) GGAG wrapped with Teflon tape on five surfaces Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. Those skilled in the art will appreciate that the invention may be implemented in other ways without departing from the spirit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

We claim:

1. A radiation sensor, comprising:
   a scintillator capable of converting non-visible radiation into scintillation light;
   a reflector formed from material of outside surfaces of the scintillator, to reflect the scintillation light from the scintillator; and
   a sensor positioned in proximity to the scintillator, to detect the scintillation light from the scintillator.

2. The radiation sensor of claim 1, wherein the reflector covers the scintillator on all surfaces except one surface of the scintillator facing the sensor.

3. The radiation sensor of claim 1, wherein the scintillator is a GGAG scintillator, and the reflector comprises $GdAlO_3$.

4. The radiation sensor of claim 1, wherein the reflector comprises a product of decomposition of the scintillator.

5. A scintillator element, comprising:
   a scintillator capable of converting non-visible radiation into scintillation light; and
   a reflector formed from material of outside surfaces of the scintillator, to reflect the scintillation light from the scintillator.

6. The scintillator element of claim 5, wherein the reflector covers the scintillator on all surfaces except one surface of the scintillator.

7. The scintillator element of claim 5, wherein the scintillator is a GGAG scintillator, and the reflector comprises $GdAlO_3$.

8. The scintillator element of claim 5, wherein the reflector comprises a product of decomposition of the scintillator.

9. A method of manufacturing a scintillator with an intrinsic reflector, comprising:
   heating the scintillator in an oxygen-deficient environment at a first temperature for a first predetermined time period to form the intrinsic reflector.

10. The method of claim 9, further comprising selectively removing a portion of the intrinsic reflector by polishing or masking.

11. The method of claim 9, wherein the oxygen-deficient environment comprises hydrogen gas.

12. The method of claim 9, wherein the oxygen-deficient environment does not include gas with oxygen.

13. The method of claim 9, wherein the scintillator is a GGAG scintillator, and the intrinsic reflector comprises $GdAlO_3$.

14. The method of claim 9, wherein the first temperature is at least 1300° C.

15. The method of claim 9, wherein the first predetermined time period is at least 10 hours.

16. The method of claim 9, further comprising annealing the scintillator in an oxygenated environment at a second temperature for a second predetermined time period.

17. The method of claim 16, wherein the oxygenated environment comprises air atmosphere or at least 20% oxygen gas.

18. The method of claim 16, wherein the second predetermined time period is at least 10 hours.

* * * * *